Patented Mar. 13, 1934

1,950,438

UNITED STATES PATENT OFFICE 1,950,438

POLYMERIZED HALOGENATED HYDROCARBONS AND PROCESS FOR PRODUCING SAME

Wallace H. Carothers, Arnold M. Collins, and James E. Kirby, Wilmington, Del., assignors to E. I. du Pont de Nemours & Company, Wilmington, Del., a corporation of Delaware No Drawing. Application February 28, 1931, Serial No. 519,241. Renewed November 29, 1933

22 Claims. (Cl. 260—6)

This invention relates to a method of preparing a new class of organic compounds. More particularly, it relates to an improvement in the process of polymerizing the addition products of monovinylacetylene and hydrochloric acid, which improvement comprises carrying out the polymerization in the presence of certain reagents adapted to retard the rate of the reaction.

The addition product treated according to the present process is fully disclosed in an application of Carothers and Collins, Serial No. 490,538, filed October 22, 1930. It is chloro-2-butadiene-1,3 having the formula $CH_2=CCl—CH=CH_2$. The combination of monovinylacetylene with hydrogen chloride to form this product may be readily effected under a great variety of conditions. A preferred method consists in shaking or stirring monovinylacetylene with a concentrated aqueous solution of hydrogen chloride containing cuprous chloride and ammonium chloride. The chloro-2-butadiene-1,3 may be separated from the unreacted monovinylacetylene by distillation.

In a second application of Carothers and Collins, Serial No. 519,243, filed February 28, 1931, the polymerization of chloro-2-butadiene-1,3 to obtain products varying from liquids boiling below 100° C. at 27 mm. to hard tough solids is disclosed. The accelerating effects on the polymerization of catalysts such as oxygen and peroxides and of heat, light and pressure and the regulation of these conditions to obtain polymers of varying hardness, strength and viscosity is fully discussed in the latter application. In a desired form the resulting polymer has to a large degree the properties of cured natural rubber.

However, when the polymerization of chloro-2-butadiene-1,3 is carried out under the above described conditions, especially when it is carried out at elevated temperatures and in the presence of air, it proceeds at such a rapid rate that it is not easy to control the polymerization to produce a product of the desired characteristics, and when the polymerization is allowed to progress until all of the chloro-2-butadiene-1,3 has reacted the rubber-like product, although it is very strong and elastic, is not dissolved but only swelled by the usual rubber solvents and it is not sufficiently plastic to be milled. Moreover, it is desirable for certain purposes to use the chloro-2-butadiene-1,3 as such and in unpolymerized form and for other purposes to interrupt the polymerization after it has progressed to a given stage.

Therefore, an object of the present invention is to inhibit the polymerization of chloro-2-butadiene-1,3 and a further object is to control the rate of polymerization to the end that maximum yields of the desired product may be obtained. A still further object is to produce a more permanent plastic product of sufficient softness to permit of its being milled and one adapted to be dissolved in benzene.

With these objects in view, it has been discovered that certain compounds will function as retarders of the polymerization and that the polymerization of chloro-2-butadiene-1,3 can be very largely prevented or, alternatively, an effective control of the polymerization can be secured to the end that products of the desired type may be obtained if there is added to the chloro-2-butadiene-1,3 prior to polymerization a small amount of such a compound.

Investigation has revealed that a very large number of compounds are adapted to exert this function in varying degrees. Such compounds are here designated as inhibitors, and for the purpose of the present invention the term "inhibitor" is defined as a substance capable of preventing or retarding the polymerization of chloro-2-butadiene-1,3.

The amount of inhibitor employed will, of course, vary, depending upon the effectiveness of the given compound and the result desired. An amount sufficient to saturate the chloro-2-butadiene-1,3 may be employed for maximum effects, while on the other hand appreciable effects may be obtained from the use of quantities as low as 0.1% of the weight of the chloro-2-butadiene-1,3.

In carrying out the process of this invention, the inhibitor is thoroughly admixed with the chloro-2-butadiene-1,3 which is either then stored for later use or is at once subjected to the conditions described in the latter of the above identified applications to effect its polymerization. By a careful control of the conditions of polymerization and amount of inhibitor employed, products of improved properties may be produced. By this means, it is possible to obtain a plastic, rubber-like mass capable of being dissolved by benzene and readily rolled out into a thin coherent sheet on a rubber mill. Or, alternatively, it is possible to obtain a tough granular rubber-like material that is completely resistant to the action of organic solvents; or to obtain a viscous non-volatile liquid polymer; or to obtain a high yield of volatile liquid polymer. Such products, when exposed to air over a considerable period of time, evidence appreciable resistance to deterioration and tend to retain their original appearance.

In order to better disclose the invention in detail, the following examples are furnished. It should be understood, however, that these examples are presented merely as illustrations of the process and that the conditions and reagents therein specified may be widely varied.

*Example I*

Chloro-2-butadiene-1,3 containing 1% of its weight of iodine was allowed to stand at the ordinary conditions in a closed vessel containing a little air. After two months all the chlorobutadiene was polymerized. The product was a soft rather waxy plastic solid. On being heated to 50° C. it melted to a viscous, sticky liquid.

Under the same conditions, but in the absence of the inhibitor, a product resembling a completely cured soft rubber was obtained in 6–14 days.

*Example II*

Chloro-2-butadiene-1,3 containing 0.1% of iodine was heated in a closed vessel containing a little air at 62° C. After 48 hours 72% of the chlorobutadiene was polymerized and the polymer mixture remaining after the evaporation of most of the chloro-2-butadiene-1,3 from the viscous product was a plastic mass soluble in benzene.

Under the same conditions, but in the absence of the inhibitor, the polymerization was more rapid and the product was more elastic and less plastic.

*Example III*

Chloro-2-butadiene-1,3 containing 1% of iodine was polymerized as in Example II. After 96 hours 86% of the chlorobutadiene was polymerized. The mixture remaining after the evaporation of most of the chloro-2-butadiene-1,3 was a very viscous liquid soluble in benzene.

Under the same conditions, but in the absence of the inhibitor, the polymerization was more rapid and the product was more elastic and less plastic.

*Example IV*

A sample of chloro-2-butadiene-1,3 was saturated with hydroquinone at the ordinary temperature. It was allowed to stand for several days and then heated to 65° C. for a few hours to remove most of the unchanged chloro-2-butadiene-1,3. The residual viscous liquid was allowed to stand in a stoppered bottle for two weeks. The product was a rubber-like mass. It was plastic and soluble in benzene. In a rubber mill it was readily rolled out into a thin coherent sheet. It did not become dark or lose its strength when freely exposed to the air for one month but retained to some degree its plastic properties while its elasticity was substantially increased.

Under the same conditions, but in the absence of the inhibitor, the reaction was complete at ordinary temperature and the product was not capable of being milled.

*Example V*

Two hundred g. of chloro-2-butadiene-1,3 was saturated with catechol at the ordinary temperature, and then heated to boiling under a reflux condenser for 30 hours. Forty-one per cent of the chlorobutadiene was polymerized. The mixture obtained by partially removing the unchanged chloro-2-butadiene-1,3 by heating in vacuo was a plastic mass soluble in benzene.

Under the same conditions, but in the absence of the inhibitor, the reaction proceeds much more rapidly. After 30 hours all the chloro-2-butadiene-1,3 has polymerized and the product is very elastic but not plastic.

*Example VI*

A sample of chloro-2-butadiene-1,3 containing 1% of pyrogallol was sealed in a vessel in the complete absence of air and heated at 62° C. After 14 days the tube was opened and the contents submitted to steam distillation. The distillate amounting to 50% of the total consisted chiefly of a volatile polymer of chloro-2-butadiene-1,3. The residue was a darkly colored sticky mass soluble in benzene.

Under the same conditions, but in the absence of the inhibitor, the polymerization is complete in 6 days. The product is a tough, non-plastic, elastic mass which is not completely dissolved but only swelled by benzene. It contains a small amount of the volatile polymer. On standing this gradually evaporates.

*Example VII*

Similar results are obtained with 1% of trinitrobenzene when polymerizing under the some conditions.

*Example VIII*

Chloro-2-butadiene-1,3 containing 1% of benzoquinone was heated in the presence of a little air at 62° C. for 24 hours. Twenty per cent of the chloro-butadiene was polymerized. The mixture remaining after the removal of most of the volatile material was plastic and soluble in benzene.

Under the same conditions, but in the absence of the inhibitor, the polymerization is more than 80% complete in 24 hours, and the product is soft and elastic but not plastic and not completely soluble in benzene.

*Example IX*

Chloro-2-butadiene-1,3 containing 1% of p-thiocresol was heated for 48 hours at 62° C. The partial removal of volatile material by evaporation gave an 80% yield of a plastic polymer soluble in benzene.

Under the same conditions, but in the absence of the inhibitor, the polymerization is complete in 48 hours and the product is a tough, strong, elastic solid. It is not plastic and is not completely dissolved by benzene.

*Example X*

Chloro-2-butadiene-1,3 containing 1% of tributyl amine was heated 120 hours at 62° C. in the presence of a little air. From the resulting mass a 33% yield of a chloro-2-butadiene-1,3 polymer mixture was obtained. This was plastic and soluble in benzene.

Under the same conditions, but in the absence of the inhibitor, the polymerization is complete in 48 hours and the product is a tough, strong, elastic solid. It is not plastic and is not completely dissolved by benzene.

*Example XI*

Chloro-2-butadiene-1,3 containing 1% of its weight of triethyl amine was allowed to stand in a closed vessel containing a little air at the ordinary conditions. In 13 days it was changed to a stiff jelly and in one month it was completely polymerized to a hard, coherent, tough mass which was non-plastic and was not swelled by rubber solvents.

Under the same conditions, but in the absence of the inhibitor, all the chloro-2-butadiene-1,3 is polymerized in about 10 days and the product is a transparent elastic mass resembling a completely cured soft rubber.

*Example XII*

Under the same conditions chloro-2-butadiene-1,3 containing 1% of its weight of dibutyl amine, n-heptyl amine or phenyl-β-naphthyl amine was completely polymerized to the same type of product described in Example XI in two months.

*Example XIII*

A sample of chloro-2-butadiene-1,3 containing 1% of its weight of trinitrobenzene is subjected to a pressure of 5000 atmospheres at 47° C. for one day. All of the chloro-2-butadiene-1,3 is then polymerized. The product is a viscous liquid completely soluble in benzene. By steam distillation it is readily separated into volatile and non-volatile polymer. The former constitutes 75% of the total. The latter is a soft, sticky mass.

Under otherwise similar conditions in the absence of the trinitrobenzene the product is a tough, elastic mass which contains only a very small amount of volatile polymer and which is not dissolved but is only swelled by benzene.

It will be evident from the above examples that the present invention contemplates the use of inhibiting agents in combination with any of the conditions disclosed in the previously filed Carothers and Collins applications as adapted to accelerate polymerization. Thus, the agents of the present invention may be added to a polymer to be maintained or polymerized in the presence or absence of air, below or above ordinary temperature and pressure, and in the presence of or absence of direct light. Moreover, it will be understood that the applicability of the inhibitors is independent of whether the chloro-2-butadiene-1,3 is in substantially pure form.

In addition to the inhibitors specifically mentioned in the above examples, a large number of compounds have been tested for their effect on the polymerization. Among the compounds which have been found to have a retarding effect, the following may be mentioned. Those marked (a) are sufficiently powerful in concentrations of 1% or less to prevent any noticeable increase in viscosity in chloro-2-butadiene-1,3 in a closed vessel containing a little air at the ordinary conditions for one month. They are practically useful for the purpose of preventing or stopping the polymerization of chloro-2-butadiene-1,3. Those marked (b) are less powerful but are useful for the purpose of controlling the properties of the polymer. The more powerful inhibitors can also be used for this purpose.

*Phenols.*—(a) Pyrogallol, catechol, guaiacol; (b) hydroquinone, p-hydroxy diphenyl, phenol.

*Quinones.*—(a) Benzoquinone; (b) α-naphthoquinone.

*Amines.*—(a) Tetraphenyl hydrazine, toluylene diamine, thiodiphenyl amine, phenyl-β-naphthyl amine; (b) diphenyl guanidine, phenyl-α-naphthyl amine, diphenyl amine, dibenzyl amine, aniline, piperidine, pyridine, dimethyl aniline, quinoline, ethylene diamine, dibutyl amine, triethyl amine, heptyl amine, benzidine.

*Nitro aryl compounds.*—(a) Trinitrobenzene; (b) nitrobenzene.

*Organic sulfur compounds containing less than three sulfur atoms and unoxidized.*—(a) Butyl mercaptan, benzyl mercaptan, thioacetic acid, thiobenzanilide, thiodiphenyl amine, thiophenol, thiocresol; (b) methyl sulfide, ethyl sulfide, n-propyl sulfide, allyl sulfide, n-butyl sulfide, n-heptyl sulfide, benzyl sulfide, diphenyl sulfide, methyl disulfide n-propyl disulfide, n-butyl disulfide, ethyl thioacetate, diethyl dithiooxalate, ethyl ethylxanthate, thioacetamide, thio-β-naphthol.

*Selenium compounds.*—Ethyl selenide.

*Halogens.*—(a) Iodine, bromine.

As will appear from the above discussion and examples the inhibitors may be used to produce a variety of effects.

(1) They may be used to prevent the polymerization of chloro-2-butadiene-1,3. This effect is useful when it is desired to store the chlorobutadiene or to use it as such, e. g., as a reagent or a reactant in a chemical reaction.

(2) They may be used to interrupt the polymerization of chloro-2-butadiene-1,3 after it has progressed to the state of a viscous liquid or a stiff jelly. This effect is useful when it is desired to use the partially polymerized mixture as such, e. g., as an adhesive or coating or impregnating material, or when it is desired to isolate the polymer from such a partially polymerized mixture.

For both of the above purposes the more powerful inhibitors, such as those marked (a) in the above list, are preferred.

(3) They may be used to diminish the rate of the polymerization. In this case the less powerful inhibitors are used or small concentrations of the more powerful inhibitors.

This diminution of rate may be offset by modifying the conditions, e. g., by raising the temperature or pressure or by exposing the sample to direct light, but in any event the presence of the inhibitor has an effect on the properties of the polymer.

(4) If the inhibitor is an amine compound as illustrated in Examples XI and XII and the polymerization is allowed to progress to completion at temperatures below 45° C., i. e., until all the chloro-2-butadiene-1,3 has reacted, the final product is a very tough, granular polymer which is completely resistant to the action of organic solvents.

(5) By the use of inhibitors the polymerization may also be directed to the formation of volatile polymers as the major product. As mentioned in the second application of Carothers and Collins, the formation of non-volatile polymer is probably a different kind of reaction from the formation of the volatile polymer. Under the ordinary conditions, the formation of the volatile polymer is such a slow reaction as compared with the formation of the non-volatile polymer that only traces of the former are present in the final polymeric product. It appears, however, that heat has a much greater accelerating effect on the formation of the volatile polymer than on the formation of the non-volatile polymer, while the reverse is true for the effect of oxygen and light. Moreover, powerful inhibitors have a very great retarding effect on the formation of non-volatile polymer but a comparatively slight effect on the formation of the volatile polymer. Hence, as shown in Example XIII, by carrying out the polymerization in the presence of powerful inhibitors at elevated temperatures large amounts of the volatile polymer are produced and the yields of the latter obtained in this way are much higher than those obtained in the absence of the inhibitor.

In general, the solid polymers produced in the presence of inhibitors are softer, more completely plastic, and more soluble than those produced under the same conditions in the absence of inhibitors, and this is invariably true if the polymer is isolated by allowing unchanged chlorobutadiene to evaporate or by allowing it to distill, preferably in vacuo or with the aid of steam, or by any other suitable means before the polymerization is complete, i. e., before substantially all the chloro-2-butadiene-1,3 has polymerized.

However, as has already been disclosed when an amine or reduced nitrogen compound is employed as the inhibitor, if the polymerization is allowed to progress at ordinary temperatures until all the chloro-2-butadiene-1,3 has reacted and without interruption to remove the unchanged chloro-2-butadiene-1,3, the resulting product, in general, is a granular, non-plastic type polymer. This type of polymer does not appear until practically all of the chlorobutadiene has reacted and by separating the polymer before this stage is reached a plastic polymer can be obtained even when nitrogen compounds are present.

Plastic polymers may also be obtained by completely polymerizing in the presence of inhibitors such as iodine as illustrated in Example 1. By using smaller or larger quantities of iodine the plasticity of the product may be diminished or increased. Similar results can be obtained by the use of other inhibitors.

The plastic polymers obtained either by removing the unpolymerized chloro-2-butadiene-1,3 at a stage prior to polymerization of all the chloro-2-butadiene-1,3 or by completely polymerizing as in Example 1 differ materially from the heat curable plastic polymers of Williams as disclosed in his application, Ser. No. 519,244 filed on even date herewith. The products of the present process frequently show a considerable degree of elasticity even when quite soft and they show less tendency to lose their plastic properties and to become vulcanized spontaneously on standing or on being heated. They are capable of being molded or sheeted out on the rolls of the rubber mill, but when they are cured simply by the action of heat the final products generally lie between balata and rubber in their elastic and plastic properties. They also show a tendency to "freeze", i. e., they frequently suffer a temporary loss of extensibility on standing. In this respect they resemble an undercured rubber. When heated for 30 minutes at a temperature of from 130° C. to 140° C. these products show no substantial change in plasticity.

It may be observed that many of the compounds listed above as inhibitors for the polymerization of chloro-2-butadiene-1,3 are antioxidants. Nevertheless, their inhibitory effect is still manifested in the absence of air, that is, samples of chloro-2-butadiene-1,3 when sealed in high vacuum (i. e., in as complete absence of air or oxygen as it is possible to realize experimentally) still polymerize more rapidly than similar samples containing an inhibitor such as catechol or trinitrobenzene.

From the above it will be evident that the addition of compounds of the type herein disclosed to the unpolymerized chloro-2-butadiene-1,3 not only tends to control the polymerization of the chloro-2-butadiene-1,3 and affect the properties of the polymer, but results in the formation of polymer products containing the inhibitor. In such mixtures the inhibitor functions to preserve the product and imparts to it greater stability and permanence.

As many apparent and widely different embodiments of this invention may be made without departing from the spirit and scope thereof, it is to be understood that we do not limit ourselves to the specific embodiments thereof except as defined in the appended claims.

We claim:

1. In the process of controlling the polymerization of chloro-2-butadiene-1,3 the step of adding an inhibitor of polymerization to the chloro-2-butadiene-1,3.

2. In the process of controlling the polymerization of chloro-2-butadiene-1,3 the step of adding to the chloro-2-butadiene-1,3 an inhibitor of the class consisting of phenols, quinones, amines, nitro aryl compounds, unoxidized organic sulfur compounds containing less than three sulfur atoms, ethyl selenide, iodine and bromine.

3. The process which comprises heating chloro-2-butadiene-1,3 in the presence of an inhibitor of polymerization.

4. The process which comprises exposing chloro-2-butadiene-1,3 to oxygen in the presence of an inhibitor of polymerization.

5. The process which comprises exposing chloro-2-butadiene-1,3 to pressures above normal in the presence of an inhibitor of polymerization.

6. The process which comprises exposing chloro-2-butadiene-1,3 to direct light in the presence of an inhibitor of polymerization.

7. The process which comprises allowing chloro-2-butadiene-1,3 to stand in the presence of oxygen and an inhibitor of polymerization.

8. The process which comprises polymerizing chloro-2-butadiene-1,3 in the presence of an inhibitor of the class consisting of phenols, quinones, amines, nitro aryl compounds, unoxidized organic sulfur compounds containing less than three sulfur atoms, ethyl selenide, iodine and bromine until a plastic extensible mass resembling uncured rubber and soluble in benzene is obtained.

9. In the process of retarding the polymerization of chloro-2-butadiene-1,3 the step of adding an antioxidant of the class consisting of catechol, pyrogallol, trinitrobenzene, m-toluylene diamine, and thiodiphenylamine.

10. The process of producing a new product which comprises partially polymerizing chloro-2-butadiene-1,3 in the presence of an agent adapted to retard the polymerization and thereafter removing unpolymerized chloro-2-butadiene-1,3.

11. The process of producing a volatile polymer of chloro-2-butadiene-1,3 which comprises heating chloro-2-butadiene-1,3 in the presence of trinitrobenzene.

12. The process of producing a tough, hard, non-plastic chloro-2-butadiene-1,3 polymer which is not swelled by benzene which process comprises polymerizing chloro-2-butadiene-1,3 in the presence of an amino compound.

13. Chloro-2-butadiene-1,3 in admixture with a compound adapted to inhibit polymerization.

14. Chloro-2-butadiene-1,3 in admixture with a polymerization retarder of the class consisting of phenols, quinones, amines, nitro aryl compounds, unoxidized organic sulfur compounds containing less than three sulfur atoms, ethyl selenide, iodine and bromine.

15. A polymer of chloro-2-butadiene-1,3 in admixture with a compound adapted to inhibit polymerization.

16. A polymer of chloro-2-butadiene-1,3 in admixture with a polymerization retarder of the class consisting of phenols, quinones, amines, nitro aryl compounds, unoxidized organic sulfur compounds containing less than three sulfur atoms, ethyl selenide, iodine and bromine.

17. A plastic polymer of chloro-2-butadiene-1,3 containing an antioxidant of the class consisting of catechol, pyrogallol, trinitrobenzene, m-toluylene diamine, and thiodiphenylamine.

18. A derivative of chloro-2-butadiene-1, 3 resulting from polymerizing the chloro-2-butadiene-1,3 in the presence of an inhibitor of the class consisting of phenols, quinones, amines, nitro aryl compounds, unoxidized organic sulfur compounds containing less than three sulfur atoms, ethyl selenide, iodine and bromine.

19. A plastic chloro-2-butadiene-1,3 polymer containing an inhibitor of polymerization and adapted to retain its plasticity upon being heated at a temperature of from 130° C. to 140° C. for 30 minutes.

20. A liquid comprising a polymer of chloro-2-butadiene-1,3 and an agent adapted to inhibit the polymerization of chloro-2-butadiene-1,3.

21. In the process of controlling the polymerization of halogen-2-butadiene-1,3 the step of adding an inhibitor of polymerization to the halogen-2-butadiene-1,3.

22. A polymer of halogen-2-butadiene-1,3 in admixture with a compound adapted to inhibit polymerization.

WALLACE H. CAROTHERS.
ARNOLD M. COLLINS.
JAMES E. KIRBY.